(12) United States Patent
Kudriavtsev et al.

(10) Patent No.: US 10,592,220 B2
(45) Date of Patent: Mar. 17, 2020

(54) METADATA-DRIVEN BINDING OF CONVERTED SOURCE CODE TO ORIGINAL SOURCE CODE

(71) Applicant: Oracle International Corporation, Redwood Shores, CA (US)

(72) Inventors: Petr Andreevich Kudriavtsev, Saint-Petersburg (RU); Vladimir Viktorovich Voskresenskii, Saint-Petersburg (RU); Egor Anatolievich Ushakov, Saint-Petersburg (RU)

(73) Assignee: Oracle International Corporation, Redwood Shores, CA (US)

( * ) Notice: Subject to any disclaimer, the term of this patent is extended or adjusted under 35 U.S.C. 154(b) by 25 days.

(21) Appl. No.: 15/706,328

(22) Filed: Sep. 15, 2017

(65) Prior Publication Data
US 2018/0081655 A1 Mar. 22, 2018

(30) Foreign Application Priority Data
Sep. 16, 2016 (RU) .................................. 2016137176

(51) Int. Cl.
*G06F 8/51* (2018.01)
*G06F 8/30* (2018.01)
*G06F 8/41* (2018.01)

(52) U.S. Cl.
CPC .................. *G06F 8/51* (2013.01); *G06F 8/30* (2013.01); *G06F 8/427* (2013.01)

(58) Field of Classification Search
None
See application file for complete search history.

(56) References Cited

U.S. PATENT DOCUMENTS 4,667,290 A * 5/1987 Goss .......................... G06F 8/47
713/1
5,768,564 A * 6/1998 Andrews ................... G06F 8/33
707/999.101

(Continued)

OTHER PUBLICATIONS

Kudriavtsev et al., U.S. Appl. No. 15/725,808, entitled "Programming Language Source Code Conversion", filed Oct. 5, 2017, 57 pages.

(Continued)

*Primary Examiner* — Chat C Do
*Assistant Examiner* — Douglas M Slachta
(74) *Attorney, Agent, or Firm* — Kowert Hood Munyon Rankin and Goetzel PC; Rory D. Rankin

(57) ABSTRACT

Systems, apparatuses, and methods for converting computer program source code from a first high level language to a functionally equivalent second high level language different from the first high level language. Source code in a first high level language that includes a plurality of name spaces is analyzed by a code conversion tool. A data structure representing the source code in the first language is generated that includes at least an identification of each symbol used within the source code in the first language. An identifier is generated for each of the identified symbols, wherein the identifier is globally unique within an entire codebase of the source code in the first high level language. Source code in the second high level programming language is generated that is functionally equivalent to the source code in the first high level programming language. Metadata is also generated that maps symbols corresponding to a semantic entity in the source code of the second high level language to symbols corresponding to a semantic entity definition in the source code of the first high level language.

20 Claims, 8 Drawing Sheets

(56) References Cited

U.S. PATENT DOCUMENTS

| | | | |
|---|---|---|---|
| 6,282,707 B1 | 8/2001 | Isozaki | |
| 7,328,403 B2* | 2/2008 | Ramarao | G06F 16/80 |
| | | | 715/236 |
| 7,340,723 B2* | 3/2008 | Antonov | G06F 8/31 |
| | | | 717/114 |
| 7,346,897 B2* | 3/2008 | Vargas | G06F 8/51 |
| | | | 717/136 |
| 7,500,229 B2* | 3/2009 | Tanaka | G06F 9/4488 |
| | | | 717/136 |
| 7,810,081 B2* | 10/2010 | Dickenson | G06F 8/436 |
| | | | 714/38.1 |
| 8,032,860 B2* | 10/2011 | Piehler | G06F 17/21 |
| | | | 717/110 |
| 8,122,017 B1* | 2/2012 | Sung | G06F 8/33 |
| | | | 707/723 |
| 8,332,828 B2 | 12/2012 | Vargas | |
| 8,656,372 B2 | 2/2014 | Vargas | |
| 8,819,650 B2 | 8/2014 | Barcia et al. | |
| 9,086,931 B2 | 7/2015 | Vargas | |
| 9,524,175 B2 | 12/2016 | Cimadamore et al. | |
| 2006/0020919 A1* | 1/2006 | King | G06F 11/3696 |
| | | | 717/124 |
| 2007/0169040 A1 | 7/2007 | Chen | |
| 2008/0141219 A1 | 6/2008 | Chinnici | |
| 2008/0222616 A1* | 9/2008 | Cheng | G06F 8/51 |
| | | | 717/137 |
| 2009/0031291 A1 | 1/2009 | Adams | |
| 2009/0055814 A1* | 2/2009 | Gallop | G06F 8/4441 |
| | | | 717/159 |
| 2009/0265684 A1* | 10/2009 | Fuchs | G06F 8/10 |
| | | | 717/105 |
| 2010/0287539 A1* | 11/2010 | Park | G06F 11/3624 |
| | | | 717/130 |
| 2011/0138373 A1* | 6/2011 | Lane | G06F 8/443 |
| | | | 717/157 |
| 2011/0167404 A1* | 7/2011 | Liu | G06F 8/33 |
| | | | 717/106 |
| 2012/0117547 A1 | 5/2012 | Balakrishnan et al. | |
| 2012/0159444 A1* | 6/2012 | Agarwal | G06F 11/3624 |
| | | | 717/124 |
| 2012/0311533 A1* | 12/2012 | Fanning | G06F 8/33 |
| | | | 717/111 |
| 2012/0311536 A1* | 12/2012 | Fanning | G06F 8/43 |
| | | | 717/123 |
| 2014/0173553 A1* | 6/2014 | Toens | G06F 8/30 |
| | | | 717/106 |
| 2014/0215112 A1* | 7/2014 | Iyer | G06F 13/4286 |
| | | | 710/106 |
| 2014/0317609 A1 | 10/2014 | Bauer | |
| 2015/0020051 A1* | 1/2015 | Rabinovitch | G06F 8/51 |
| | | | 717/124 |
| 2016/0154673 A1* | 6/2016 | Morris | G06F 9/5027 |
| | | | 718/100 |
| 2017/0024193 A1* | 1/2017 | Goubier | G06F 8/425 |
| 2018/0081654 A1 | 3/2018 | Kudriavtsev et al. | |
| 2018/0275977 A1 | 9/2018 | Kudriavtsev et al. | |

OTHER PUBLICATIONS

Notice of Allowance in U.S. Appl. No. 15/725,808, dated Jun. 25, 2018, 8 pages.

Alomari et al., "Comparative Studies of Six Programming Languages", Apr. 2, 2015, 71 pages, https://arxiv.org/ftp/arxiv/papers/1504/1504.00693.pdf. [Retrieved Apr. 30, 2018].

Malabarba et al., "MoHCA-Java: a tool for C++ to Java conversion support", Proceedings of the International Conference on Software Engineering, Feb. 1999, 4 pages, http://web.cs.ucdavis.edu/~devanbu/dp.tex.pdf. [Retrieved Apr. 30, 2018].

Martin et al., "C to Java Migration Experiences", Proceedings of the Sixth European Conference on Software Maintenance and Reengineering, Mar. 13, 2002, 11 pages, http://citeseerx.ist.psu.edu/viewdoc/download?doi=10.1.1.9.2894&rep=rep1&type=pdf. [Retrieved Apr. 30, 2018].

Martin et al., "Strategies for Migration from C to Java", Proceedings of the Fifth European Conference on Software Maintenance and Reengineering, Mar. 14, 2001, 10 pages, https://pdfs.semanticscholar.org/5fcc/0219ea8ab9ab9f38eb27ce4ec31662366902.pdf. [Retrieved Apr. 30, 2018].

Saini et al., "An Analytical Study of C++ to Java Migration Strategy Using Conversion Tool", International Journal of Computer Application and Technology, Techno Publications, May 2014, pp. 75-78, http://www.academia.edu/7398578/An_Analytical_Study_of_C_to_Java_Migration_Strategy_Using_Conversion_Tool. [Retrieved Apr. 30, 2018].

Stricker, Scott, "Java programming for C/C++ developers", IBM Corporation, May 28, 2002, 47 pages, https://www.seas.upenn.edu/~cis1xx/resources/JavaForCppProgrammers/j-javac-cpp-ltr.pdf. [Retrieved Apr. 30, 2018].

Non-Final Office Action in U.S. Appl. No. 15/706,297, dated Apr. 4, 2019, 8 pages.

* cited by examiner

FIG. 7

```
Source | Decompile | History

55  @Conversions({
56    @Converted (origin = "LLVM36", revision = "123455",
57      kind = Converted.kind.MANUAL_COMPILATION,
58      source = "${LLVM_SRC}/llvm/lib/Support/Unix/Signals.inc", line = 123,
59      FQN = "SignalsMutex", NM = "_ZL12SignalsMutex",
60      cmd = "jclank.sh ${LLVM_SRC}/llvm/lib/Support/Signals.cpp -nm=_ZL12SignalsMutex"),
61    @Converted (origin = "LLVM38", revision = "55555",
62      kind = Converted.kind.AUTO,
63      source = "${LLVM_SRC}/llvm/lib/Support/Unix/Signals.inc", line = 321,
64      FQN = "SignalsMutex", NM = "_ZL12SignalsMutex",
65      cmd = "jclank.sh ${LLVM_SRC}/llvm/lib/Support/Signals.cpp -nm=_ZL12SignalsMutex")
66  })
67  public static final SmartMutex *SignalsMutex*:*:<new SmartMutex><true>*(true);
```

702A, 702B, 704A, 704B, 706, 708, 710, 720, 740

Context menu (720):
- Converted
- Navigate
- Show Javadoc          Alt-F1
- Find Usages           Alt-F7
- Call Hierarchy
- Insert Code...        Alt-Insert
- Fix Imports           Ctrl+Shift-I
- Refractor
- Format                Alt+Shift-F
- Run File              Shift-F6
- Debug File            Ctrl+Shift-F5
- Test File             Ctrl-F6
- Debug Test File       Ctrl+Shift-F6
- Run Focused Test Method
- Debug Focused Test Method
- Run Into Method
- New Watch...          Ctrl+Shift-F7
- Toggle Line Breakpoint  Ctrl-F8

Submenu (740):
- Go to native LLVM38 source
- Go to source in previous LLVM36
- Show symbol diff
- Show full symbol diff
- Show semantic full symbol diff
- Convert in Output
- Convert in Output without Body
- Check Type Conversion
- Mark as updated
- Reconvert class
- Reconvert class without bodies
- Reconvert Function
- Reconvert Function without Body
- Regenerate class from script
- Regenerate class without bodies from script

METADATA-DRIVEN BINDING OF CONVERTED SOURCE CODE TO ORIGINAL SOURCE CODE

CROSS REFERENCE TO RELATED APPLICATIONS

This patent application claims priority to and the benefit of Russian Patent Application No. 2016137176, filed on Sep. 16, 2016, the contents of which are hereby incorporated by reference in their entirety.

BACKGROUND

Technical Field

This disclosure relates to computing systems, and more particularly to translating computer program source code from a first high level language to a second high level language.

Description of the Related Art

Most businesses today rely heavily on computer programs to efficiently and effectively run and manage their operations. For example, businesses rely on computer programs to manage inventory, distribution, accounting, employee records, and so on. Likewise, individuals rely on computer programs to manage and enhance their daily lives. For example, individuals may use various programs on desktop or mobile devices to create documents, manage their personal finances, and track their kid's school activities. As such, computer programs are an indispensable part of our everyday lives.

Given the importance of computer programs in the society, maintaining such programs is of critical importance. When a program fails, the consequences can be far reaching. In addition to ensuring computer programs are properly maintained, it is often the case the programs are enhanced or modified to add new features. Such new features may be required to accommodate a new business process or procedure, or may simply be a feature deemed desirable by users of the computer program.

One important feature of modern computer programs are that they are typically written in a high level language, such as the C++ programming language or the Java® programming language (Java, or JAVA as used herein, is a registered trademark of Oracle and/or its affiliates). This high level language representation of a computer program is referred to as the source (program) code. High level programming languages are easier for people to read and understand than programs that are not written in a high level language. Consequently, they are easier to maintain and enhance as described above. In addition, such languages allow for the expression of more abstract ideas and the creation of more functionality with less programmer effort.

While maintaining the original and revised source code is important, in some cases there is a desire to convert (or translate) source code from one high level language to another high level language. Some reasons for converting from one high level language to another high level language may include a move to a new development system or environment, a desire to take advantage of features not available in the original source code, a desire for more portable program code, or otherwise. While some tools exist to aid in automating the conversion from one high level language to another, it is often very difficult to relate converted source code to the original source code from which it was generated.

SUMMARY

Various embodiments of a system, apparatus, and methods for translating computer program code from a first high level language to a second different high level language are described herein. In various embodiments, source code in a first high level language that includes a plurality of name spaces is analyzed by a code conversion tool. A data structure representing the source code in the first language is generated that includes at least an identification of each symbol used within the source code in the first language. An identifier is generated for each of the identified symbols, wherein the identifier is globally unique within an entire codebase of the source code in the first high level language. Source code in the second high level programming language is generated that is functionally equivalent to the source code in the first high level programming language.

In addition to the above, in various embodiments the globally unique identifier comprises a fully qualified name within the codebase and one or more additional characters that serve to distinguish from any other entities in the codebase that also have said fully qualified name. Further, metadata is generated that maps symbols corresponding to a semantic entity in the source code of the second high level language to symbols corresponding to a semantic entity definition in the source code of the first high level language. In addition, in some embodiments the metadata further associates the globally unique identifier with a fully qualified name in the codebase and a location of a corresponding entity in the codebase.

In further embodiments, the code conversion tool is configured to generate an annotation in the source code of the second high level language associated with each symbol corresponding to a semantic entity in the source code of the first high level language. The annotation includes at least an indication of a type of conversion used when generating the symbol corresponding to a semantic entity in the source code of the first high level language.

BRIEF DESCRIPTION OF THE DRAWINGS

FIG. 7 illustrates one embodiment of a graphical user interface and development environment using annotated source code.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Figure 1:
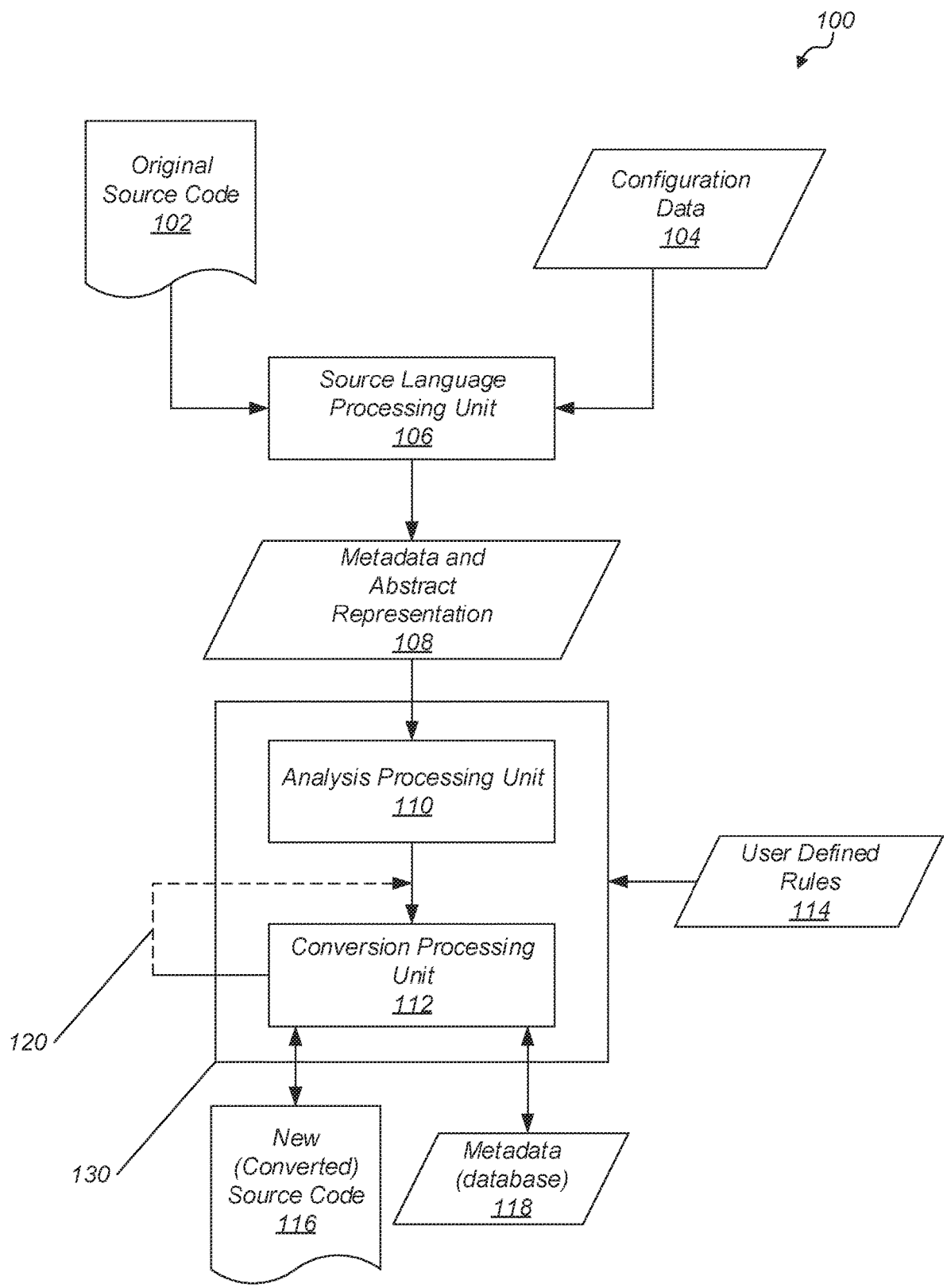
FIG. 1 illustrates an overview of a workflow for translating source code from an original high level language to a new high level language.

FIG. 1 illustrates a workflow for analyzing original source code in a high level language and converting (or translating) the original source code to a new source code in a second high level language that is functionally equivalent to the original source code. As used herein, a "high level language" refers to a programming language that is expressed in human-readable code that applies a common language specification for understanding human-readable words to express desired software functionality. Examples of high level languages include the programming languages C, C++, Java®, Python, JavaScript, PHP, as well as many others. In the illustrated embodiment, various sources of data and units (e.g., software units configured to perform computing tasks) configured to process data are depicted and are discussed below.

As shown in FIG. 1, a source language processing unit (which may also be referred to as a "tool") 106 is illustrated. In various embodiments, this source language processing unit 106 may comprise, or otherwise correspond, to one or more units typically associated with a compiler frontend. To this end, the source language processing unit 106 includes functionality to analyze original source code 102 and produce metadata and/or one or more abstract representations of the original source code. Such metadata and abstract representation(s) may include a symbol table and an abstract syntax tree. Those skilled in the art will appreciate a variety of other types of data may be produced by a compiler frontend or similar tool. In one embodiment, a publically available frontend tool called "Clang" is used for this purpose. Clang is a compiler frontend for C based languages such as C, C++, Objective-C, and others. Generally speaking, the source language processing unit 106 is configured to process source code corresponding to a particular high level language—such as the C programming language, the C++ programming language, the PHP programming language, the JAVA programming language, and so on. In the example shown, configuration data 104 may be used to configure the source language processing unit 106 in various ways. For example, the configuration data 104 may indicate a particular type of source code corresponding to a given language and/or version of a language to be processed, potential optimizations to the code, and so on. Additionally, configuration data 104 may be used to indicate a type of target code that is ultimately desired. A variety of such options are possible and are contemplated.

Also illustrated in FIG. 1 are an analysis processing unit/tool 110 and a conversion processing unit/tool 112. In various embodiments, each of the units illustrated in FIG. 1 represent executable program code. Though it is to be understood that in other embodiments units, or even portions of such units, may represent hardware (e.g., circuitry designed to perform the functionality of the corresponding unit). For ease of discussion, each of units 106, 110, and 112, are depicted as separate and distinct unit. As such they may represent, and be implemented as, completely separate units. For purposes of discussion, the units 110 and 112 may be collectively referred to as a code conversion tool despite the fact they may be implemented as separate and distinct tools. In one embodiment, source language processing unit 106 represents one application (or tool) and analysis and conversion units 110 and 112, respectively, together form a second application (or tool) 130. Alternatively, all units may be included as part of a single tool or application.

As shown in the example, source language processing unit 106 takes as input original source code 102 and generates metadata and abstract representation 108. In various embodiments, the metadata and/or abstract representation includes an identification of each symbol used in the source code. In addition, symbols or statements with a particular meaning are identified. Symbols, statements, and collections of statements or symbols with such semantic content are identified and may generally be referred to herein as "semantic entities." Examples of semantic entities include, but are not limited to, constructors, fields, local variables, methods and functions, packages, parameters, types, and so on. Additionally, in some embodiments, a fully qualified name (FQN) may be generated for each symbol. As those skilled in the art understand, an FQN may be used in order to disambiguate otherwise identical symbols within a given namespace. Such an FQN will be further discussed below. This generated metadata and abstract representation is then analyzed by analysis processing unit 110. In one embodiment, analysis and processing unit 110 and conversion processing unit 112 are designed to analyze the data 108 with the goal of producing functionally equivalent source code in a high level language 116 other than the original source code 102. For purposes of discussion, the programming language represented by the original source code 102 will be the C++ programming language (the source language), and the new source code 116 generated by the application 130 will be the JAVA programming language (the target language). However, upon consideration of the present disclosure, those skilled in the art will appreciate that the principles, methods, and mechanisms described herein may be applied different source and target languages.

In one embodiment, the processing performed by the analysis processing unit 110 and the conversion processing unit 112 may be at least in part iterative (as indicated by arrow 120). For example, as will be described in greater detail, analysis processing unit 110 may analyze the data 108 generated by the source language processing unit 106. Based upon this analysis, the analysis processing unit 110 creates data that identifies structures and elements in the original source code 102 that require corresponding code in the new source code 116. Conversion processing unit 112 further generates metadata 118 that associates the new converted source code to the original source code. Based upon this data, the conversion processing unit 112 generates corresponding source code 116. In various embodiments, the new source code 116 includes annotations that provide additional information regarding the conversion that was performed and enable additional functionality as will be described. In various embodiments, the initially generated new source code 116 is not deemed fully complete until it has been analyzed further. Such analysis may be performed by unit 112 and/or unit 110. If it is determined that the generated source code 116 requires modification, then conversion processing unit 112 may iterate 120 or otherwise modify the new source code as needed and possibly re-verify the modified code. In various embodiments, reasons for modifying the new source code 116 may include determining the initially generated new source code 116 includes syntax errors, is not functionally equivalent to the original source code 102, or some other reason that prevents the new source code 116 from being a usable valid representation of the original source code 102. Similar to the configuration data 104, user defined rules 114, or other configuration data, may be used to control the analysis processing unit 110 and/or conversion processing unit 112. Once it is determined that processing by the analysis 110 and conversion processing unit 112 are complete, the workflow of FIG. 1 is complete. In addition to generating corresponding programming statements in the new source code, comments in the original source may also be included in the new source code.

Figure 2:
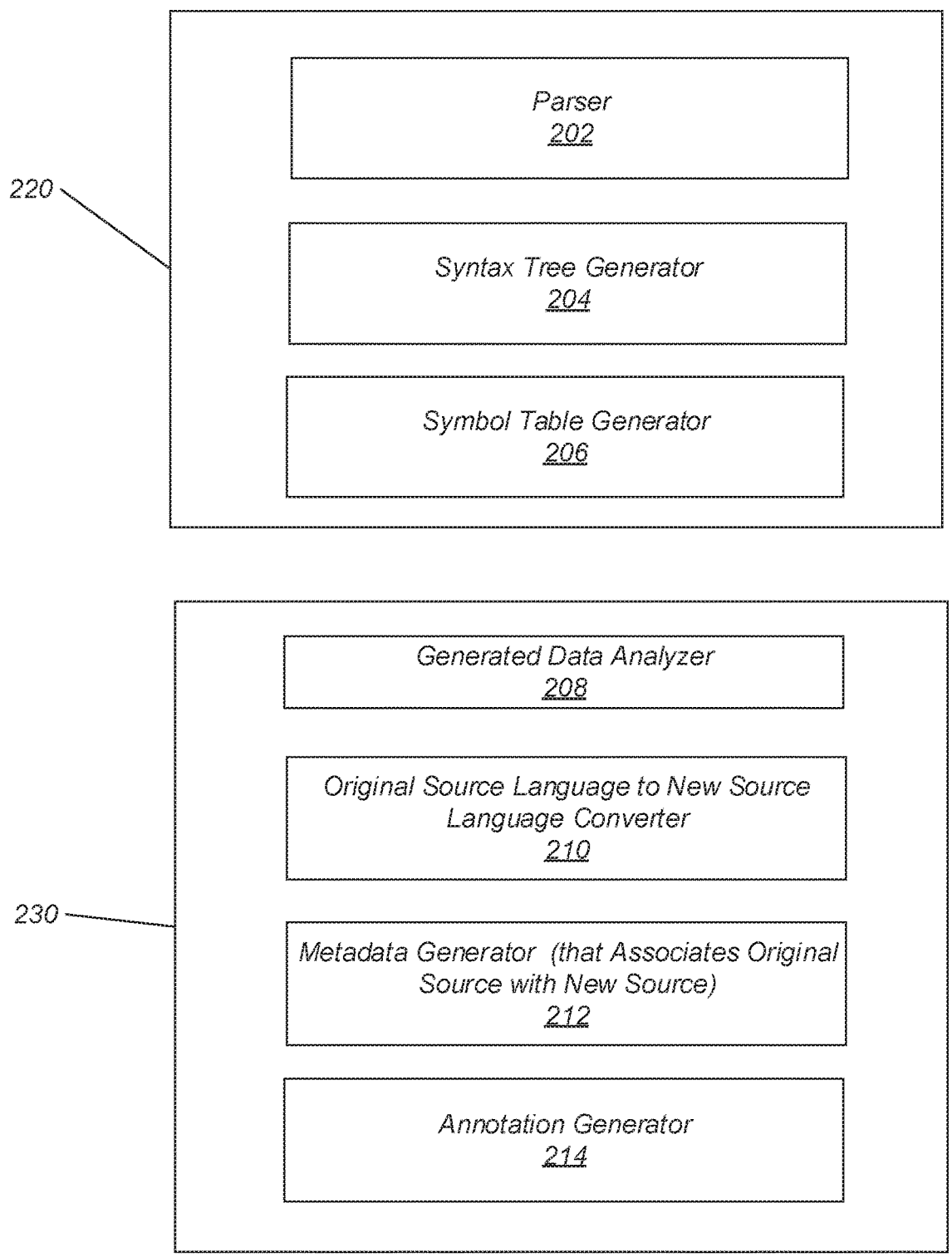
FIG. 2 illustrates one embodiment of program code analysis and conversion elements that may be used in the workflow of FIG. 1.

FIG. 2 illustrates one embodiment of elements or units (or "subunits") corresponding to the source language processing unit 106, the analysis processing unit 110, and conversion processing unit 112 of FIG. 1. In the example shown, block 220 illustrates functionality (which may be in the form of one or more units) that may be included in the analysis processing unit 110 of FIG. 1. In this example, the included units include a parser 202, syntax tree generator 204, and symbol table generator 206. It is noted that the analysis processing unit 110 may include additional and/or different functionality not explicitly called out in FIG. 2. For example, it may include functions to perform syntax analysis, semantic analysis, and otherwise.

Block 230 of FIG. 2 illustrates one embodiment of functionality (including one or more components or units) corresponding to the analysis processing unit 110 and conversion processing unit 112 of FIG. 1. In this example, the components include a generated data analyzer 208 to analyze data generated by one or more components of block 220. Also included is an original source language to new source language converter 210 and metadata generator 212 for use in supporting generation of the new source code and associating the new source code with the original source code. FIG. 2 also illustrates inclusion of a converted source code annotation generator 214 configured to annotate the new source code as discussed above. In some embodiments, other units or components may be present to generate executable code (e.g., bytecode or an executable binary) from the newly generated new source code As discussed above, it is a goal of the workflow of FIG. 1 to produce a usable and functionally equivalent new source code that corresponds to the original source code with annotations that bind/associate the converted source code to the original source code. In order to achieve such a binding, metadata is generated while processing the data.

Figure 3:
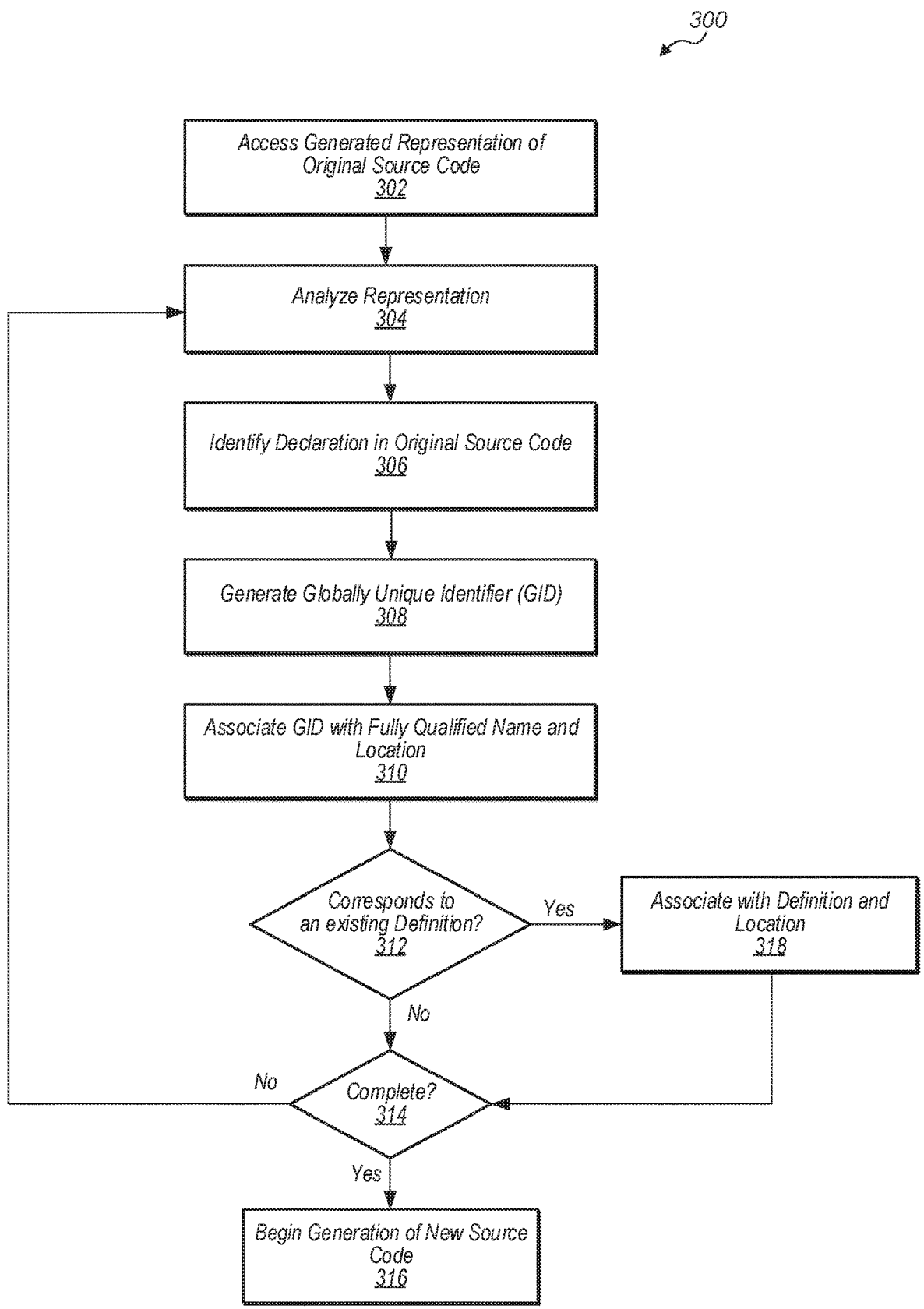
FIG. 3 illustrates one embodiment of a method for generating metadata to bind converted source code to original source code.

FIG. 3 illustrates one embodiment of a method for processing the representation of the original source code. As shown in the example, the code conversion tool accesses the representation of the original source code that was generated by the source language processing unit (block 302) and analyzes the representation (304). Upon identifying each semantic entity in the representation (306), the conversion tool generates a globally unique identifier (GID) (block 308). Generally speaking, a "semantic entity" may include any symbol or collection of symbols with identifiable semantic content. It is noted that the GID is globally unique with respect to the original codebase (i.e., the entire collection of source code used for generating a given application), and not just unique with respect to a given namespace. As such, when generating a GID it must be ensured that the GID is in fact globally unique within the entire codebase. In one embodiment, access to all GIDs that have been created thus far may be used to ensure a new GID is in fact globally unique. In other embodiments, new GIDs may be created using an approach that is known will not repeat—for example, adding a monotonically increasing value to an identifier (e.g., a fully qualified name). Alternatively, extra attributes may be added to make a FQN (e.g., a mangled name) globally unique. Examples of such attributes include a source file name, an entity kind, a monotonically increasing index, and so on. These and other approaches are possible and are contemplated. As known to those skilled in the art, a namespace is a given region providing a scope to the identifiers that are within it. Based upon this concept, two identical identifiers may exist as long as they are not within the same namespace. In this manner, namespaces can be used to prevent name collisions. Because large codebases typically include many files and namespaces, some compilers (e.g., such as those used for the C++ programming language) use techniques such as name mangling to disambiguate identical identifiers. While such an approach is useful for its intended purpose, it does not result in identifiers that are globally unique across a namespace. Consequently, when converting one source language to another that utilizes different concepts with respect to namespaces, problems may arise when trying to map a converted semantic entity (e.g., a function) to an original semantic entity in an original source codebase. To address such problems, block 306 generates a globally unique identifier for each semantic entity. That is to say, each semantic entity is given an identifier that is unique within not just a namespace, but the entire codebase. This GID is associated with exactly one semantic entity in the original source code and may also be associated with the original fully qualified name (FQN) (block 310). In various embodiments, the GID is based on an original FQN that is not globally unique within the original codebase and is extended with extra markers or symbols to make it globally unique. For example, the original codebase may have multiple namespaces the utilize a same FQN. The method and mechanism described herein modifies these FQNs such that they are globally unique within the entire codebase. The same GID is then used for a given declaration of a corresponding semantic entity and the corresponding definition of the semantic entity in C++. Additionally, the generated GID is the same for the associated declaration even in different versions (e.g., revisions) of the source code. As will be later described, the GID can be used as a (primary) key to query generated metadata (e.g., a metadata database such as metadata 118 of FIG. 1) to get information about a current: location, properties, and so on. In various embodiments, such associations may be stored as metadata that is associated with both the original source code and the new source code.

Having generated a GID for the declaration (block 310), a determination is made as to whether this declaration corresponds to an existing definition for the declaration (block 312). This may be determined, for example, by comparing the declaration to already created metadata that identifies already encountered declarations, their names, locations, and namespaces (e.g., via analysis of included files or otherwise). If the declaration is associated with an existing definition, data is stored that associates it with the existing definition. If processing is complete (block 316), then generation of the final (new) source may begin (block 316) or otherwise continue to completion if already begun. Any declarations encountered and processed before encountering their corresponding definitions will also be associated with those definitions when they are encountered as described above FIG. 4 illustrates one embodiment of a method for generating new converted source code that is also annotated. In this example, annotations of processed declarations are emphasized. As such, generation of other new source code is not generally discussed. In one embodiment, the new source code that is generated is in the JAVA programming language and the annotations in the source code are generated using JAVA programming language annotations. Generally speaking, JAVA "annotations" are a form of metadata that provide data/information about a program and are not themselves a part of the program. These JAVA annotations have no direct effect on the operation of the code (i.e., the functionality of the executed program code) they annotate. In various embodiments, these annotations are inserted into the source code immediately prior to the programming statement to which they pertain, though other embodiments may do otherwise. An example of such an annotation will be provided in FIG. 7. While JAVA annotations are illustrated in the example, other forms of annotation may be used. For example, annotations may be added in the form of comments or comments blocks. A variety of such embodiments are possible and are contemplated.

Figure 4:
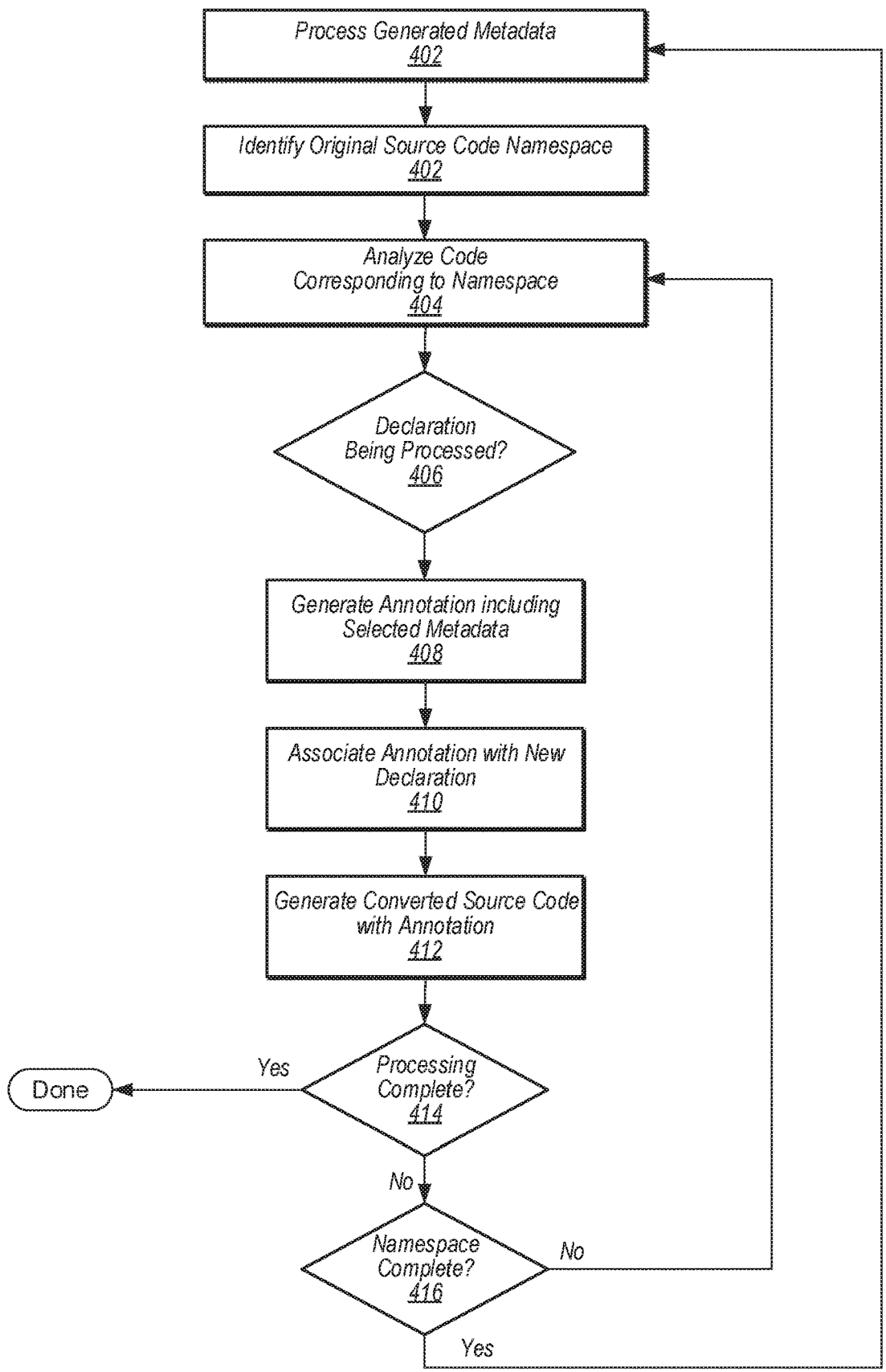
FIG. 4 illustrates one embodiment of a method for generating new source code with annotations and metadata.

In the example of FIG. 4, the metadata that was generated by the earlier processing of the original source code, the generated representation, and analysis, is processed (block 402) in order to identify structures and elements of the original source code that are to be recreated or emulated in the new source code. In one embodiment, source files and/or namespaces may be processed separately. In this manner, corresponding namespaces may be created in a similar manner in the target language. For example, in an embodiment in which the target language is the JAVA programming language, code corresponding to a given namespace in the original source code may be processed to generate a JAVA package in new source code. However, in other embodiments, the data may be processed otherwise.

As shown, code corresponding to a given namespace is analyzed (block 404). If it is determined that a declaration is to be processed (block 406), an annotation corresponding to the declaration is generated (block 408). In various embodiments, this annotation may include any of a variety of elements.

As an example, an annotation may include an indication of one or more of a kind of conversion performed, a type of optimization performed, an additional note, or otherwise. A non-exclusive list of examples of such annotation indications are as follows:

An indication of the Kind of conversion performed, which may be:
  DUMMY—a dummy implementation for the function.
  AUTO—to indicate that the code was converted automatically (i.e., does not include any manually generated code).
  BODY_DELEGATE—to indicate delegates to the function implementation are defined in another class.
  MANUAL—to indicate that the original code was manually converted or manually fixed/modified after automatic conversion.
  MANUAL_NON_JAVA—to indicate the new code was manually fixed/modified to handle a non-JAVA supported case (e.g., this +1).
  MANUAL_SEMANTIC—to indicate the new code was manually fixed/modified due to a semantic error in the conversion.
  MANUAL_COMPILATION—to indicate the code was manually fixed/modified to correct a compilation error (e.g., a manual cast variable from long/*uint*/ to int).
  MANUAL_DUPLICATED—to indicate manual duplication from a real declaration (e.g., to increase performance).
  MANUAL_ADDED—to indicate code was manually added that was not in the original source code.
  AUTO_NO_BODY—to indicate the code was automatically converted without bodies.
  MANUAL_NO_BODY—to indicate the code was manually fixed/modified to correct automatic conversion without bodies.
  DELETED—to indicate program code has been removed.
  DELETED_RED—to indicate program code has been removed because it is redundant in the new (target) source code.
  TARGET_FEAT—to indicate program code has been modified for purposes of optimization, while remaining functionally equivalent, to take advantage of a feature that exists in the target source code that didn't exist in the original source code. This annotation may be extended to further indicate a performance related type of feature. For example:
    TARGET_FEAT_LOAD_TIME—indicates the program code was modified to take advantage of an improved load time feature of the target source code.
    TARGET_FEAT_EXEC_TIME—indicates the program code was modified to take advantage of an improved execution time feature of the target source code.
    TARGET_FEAT_MEM_USAGE—indicates the program code was modified to take advantage of an improved memory usage feature of the target source code.
  SOURCE_FEAT—to indicate program code has been modified due to a feature that exists in the original source code that doesn't exist in the target source code. Similar to the target features annotation (TARGET_FEAT), this annotation may also be extended to indicate the nature of the feature that exists in the original source code that doesn't exist in the target source code (e.g., load time, execution time, memory usage, etc.).
  DEPRECATED—to indicate program code should perhaps be removed from the code, but most likely will remain.

In addition to the above, an indication of an Optimization may be provided as well, including:
  NONE—No optimization was performed.
  COMPLEX—the code was manually modified to optimize memory and/or speed.
  VALUE_TYPE—to indicate the code was manually modified to reuse instances instead of allocating per call.

In addition to the above, an indication of a Note may be provided, including:
  NONE—No note added.
  FIXME—A comments/note that a correction is needed.
  FAILED—A note that the conversion failed for some reason.

The generated annotation is then associated with the declaration (block 410). In the above scenario, a JAVA annotation is created in the generated new source code (block 412) immediately prior to the declaration. In addition, an indication of the generated annotations may also be stored as separate metadata with other generated metadata (e.g., including the previously generated representation and other data) that may be later accessed as needed or otherwise desired. If processing is not complete (block 414) and processing of the namespace has not been completed (block 416), the method returns to block 404 to continue analyzing the code and metadata corresponding to the namespace. If the namespace is complete, the processing returns to block 402 where a new namespace may be processed. Subsequently, the generated new source code, annotations, and any other metadata, are stored in a storage device (e.g., memory, disk, or otherwise).

Figure 5:
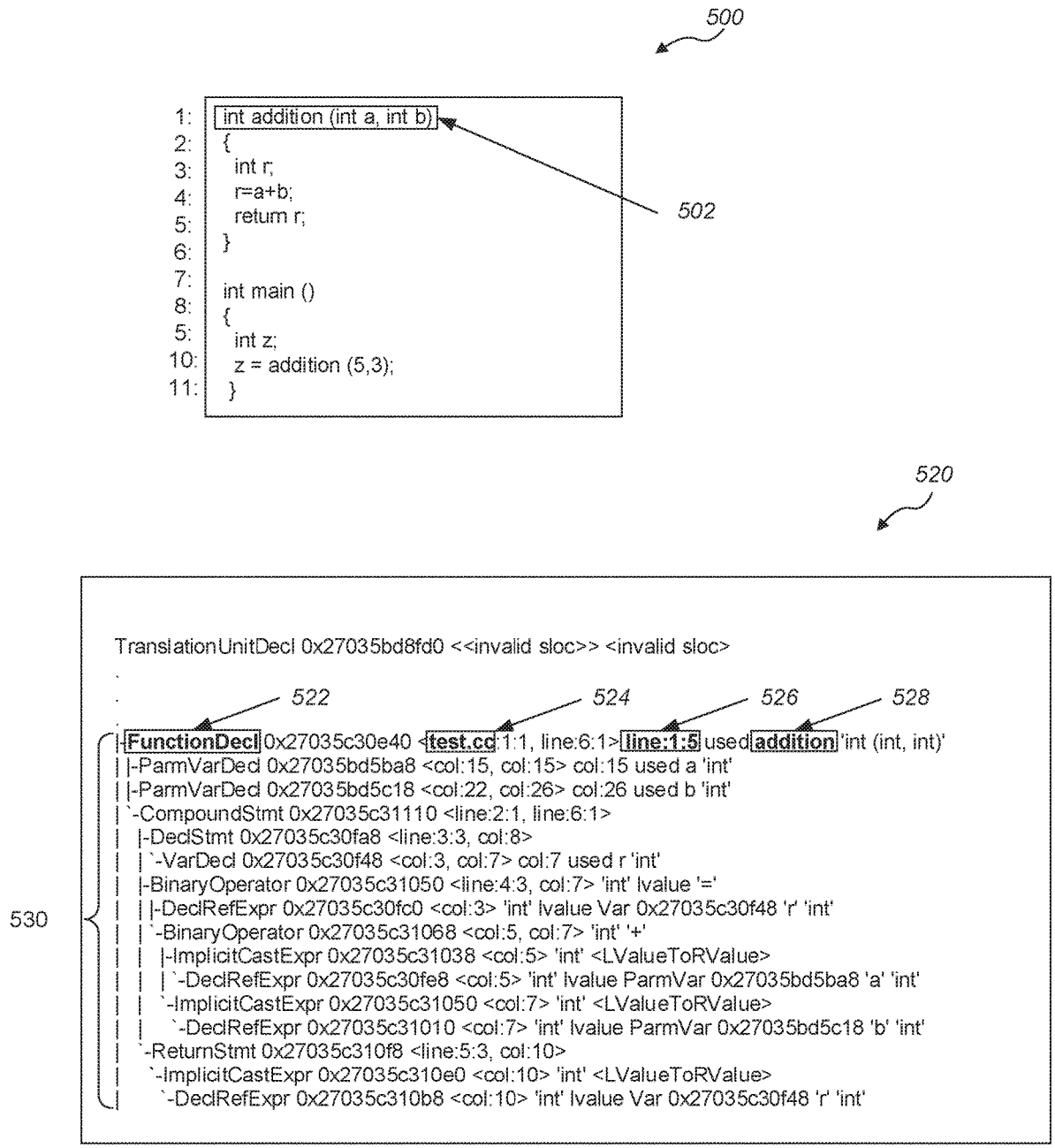
FIG. 5 illustrates one embodiment of original source code and a portion of a corresponding abstract syntax tree.

In the above discussion, the generation of a representation of the original source code was described as well as other metadata. FIG. 5 provides an example of source code 500 and sample representational data 520 that may be generated by a frontend compiler type tool, such as the Clang tool. In the sample source code 500, a semantic entity (in this case a function declaration named "addition") 502 is identified during parsing and analysis of the program code. In the representation 520, the source code has been processed, identified, and organized. In this example, the Clang tool uses the keyword FunctionDecl 522 to indicate the identified semantic entity corresponds to a function declaration. The data also identifies the source file 524 (test.cc) where the declaration is found, as well as the line number and position (526) within the file where it is located and the name 528 of the function. In addition to this information, the beginning and the end of the function are identifiable 530. Based upon this, and other information that may be gathered from the generated data, metadata associating the original source code to the new source code can be generated and maintained. For purposes of discussion, a function declaration is used as an example of a semantic entity. However, as noted above, a semantic entity may include any symbol or collection of symbols with identifiable semantic content. Accordingly, the methods and mechanisms described herein are applicable to such semantic entities as well.

Figure 6:
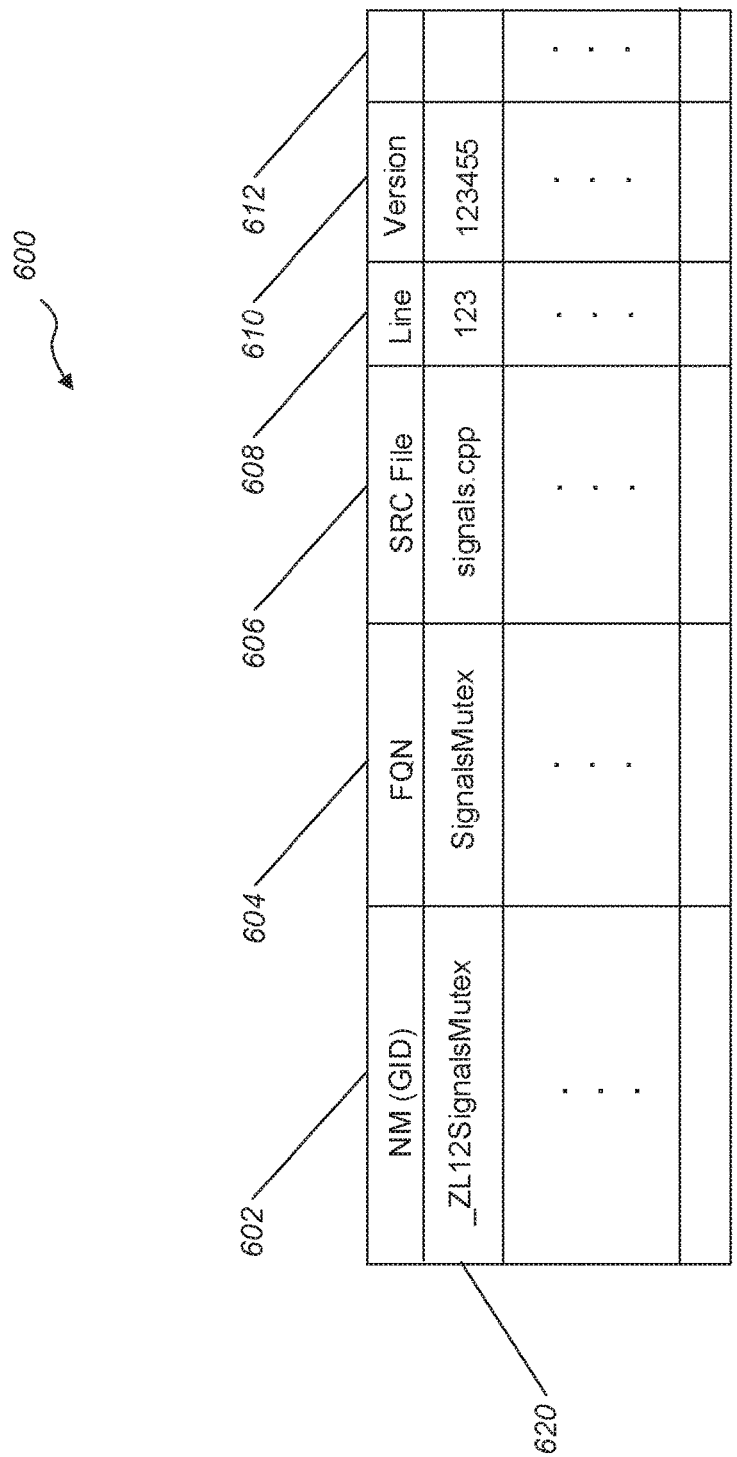
FIG. 6 illustrates one embodiment of a metadata maintained in association with converted source code.

As an example, FIG. 6 illustrates a portion of generated metadata (e.g., a metadata database) 600 in addition to that described above that may be maintained in association with the original source code and new source code. In the example shown, which represents a small part of the metadata, a variety of types of information are illustrated. For example, a first row of the depicted table includes entries for a globally unique identifier (GID) for a declaration name 602, a fully qualified name (FQN) 604 for the declaration name, the source file in which the declaration is located 606, the line within the source file where the declaration is located, a version of the code corresponding to the declaration 610, and other possible data 612. Such other data may include mappings to a definition, other corresponding declarations, and so on. It is noted that the table depicted in FIG. 6 is merely provided to illustrate some of the types of information that may be maintained. In various embodiments, the data may be stored in any of a variety of forms, in one or more databases (e.g., a global database), or otherwise. Further, a different database may be generated for each version of the original source code if desired. These different databases may be maintained as logically separate databases in a single larger database, maintained as physically separate databases, or any of a variety of other approaches known to those skilled in the art.

Having generated the new source code and annotation metadata, a software developer may then examine and/or modify the new code. FIG. 7 depicts one embodiment of annotated new source code generated according to the methods and mechanisms described herein. In the example shown, the new code is displayed within a typical integrated development environment. In this example, a select number of lines of the source code (lines 55 to 67) are shown. Line 67 of the code is a programming statement that was generated as new source code from the original source code. Immediately above this line is a JAVA programming language annotation. This annotation begins at line 55 with the "at" symbol (@) and includes two separate (sub)annotations—one beginning at line 56 (@Converted) and one beginning at line 61 (@Converted). Each of these annotations represents a different version of the new source code generated from original source code. For example, in one embodiment the first annotation beginning at line 56 corresponds to the first conversion of the original source code, and the second annotation at line 61 corresponds to a subsequent version of the original source code. These recorded versions can show an evolution in the original source code. Such a scenario may occur due to a revision or modification of the original source code that required a corresponding revision to the new source code.

Each of the depicted annotations (which are part of a larger single annotation in this example) include selected metadata that was generated by the code conversion tool as described in FIG. 4. The first piece of metadata is an "origin". In this case, the compiler infrastructure used as part of the process (LLVM36 in the first annotation and LLVM38 in the second annotation—LLVM is a publicly available collection of compilation tools) is identified. Also included is a version/revision number 702A and 702B of the origin tool for use in version tracking. It is noted that while the location was at line 123 for version 123455, and the location changed to line 321 for revision 55555, the GID allows both to be associated with one generated entity (e.g., JAVA entity in this example). The kind of conversion (704A, 704B), as previously discussed, is included here as well. The first indicates manual compilation was used to indicate the code was manually fixed/modified to correct a compilation error, while the second indicates the conversion was performed automatically. In various embodiments, the annotation may also indicate a retention policy which specifies where the annotations are to be retained (e.g., "@Retention (value=SOURCE)"). As an alternative, a retention policy of "runtime" or "class" could be indicated. For example, when indicating runtime as the retention policy, annotations could be retained in a binary or intermediate version (e.g., bytecode in the case of JAVA). In such a case, the annotations could be used to guide or enable runtime optimizations (e.g., by a JAVA Virtual Machine). As one possible runtime annotation, a JAVA Virtual Machine may call an original C++ method. Alternatively, when indicating class as the retention policy, annotations may be retained in a class file by the complier but not retained at runtime (e.g., by a JAVA Virtual Machine). Annotations provided to indicate these and other policies are possible and are contemplated. Also shown in the example of FIG. 7, the source file and location within the file is identified (706) to enable access to the original source code for purposes of examination, reconversion, comparison with other versions, or otherwise. Also included in the annotation is a globally unique identifier "_ZL12SignalsMutex" (708) for the declaration. Both the globally unique identifier and FQN "SignalsMutex" correspond to the name 712 of the function (SignalsMutex) which is shown in the declaration itself at line 67. Finally, the annotation further includes the command 710 that was used to generate the declaration. These and other annotation entries may present, and may also be stored as part of the data discussed in relation to FIG. 6.

With the annotation present in the source code and/or in the stored metadata, ready access to the original source code can be had. For example, in the example of FIG. 7, selecting line 67 which includes the declaration may enable a popup or dialog (e.g., via right mouse click, etc.), that brings up various options 720, one of which is an option related to the converted code ("Converted"). Accessing this menu item provides a list of functions 740 that take advantage of the annotations and metadata. For example, the annotations indicate both the original LLVM (LLVM36) and subsequent LLVM (LLVM38). With the knowledge that these represent the bases from which the code was generated, the developer can directly access those sources for further exploration or any other purpose. Also shown are entries to execute various forms of text comparisons (e.g., "diffs")—both symbol based and semantic based. Having access to the generated representations previously discussed may allow a comparison of between different versions and any corresponding semantic differences. Given direct access to the original source, a variety of conversions are also made available—conversions with or without bodies, reconversions, class regeneration, and so on.

Figure 8:
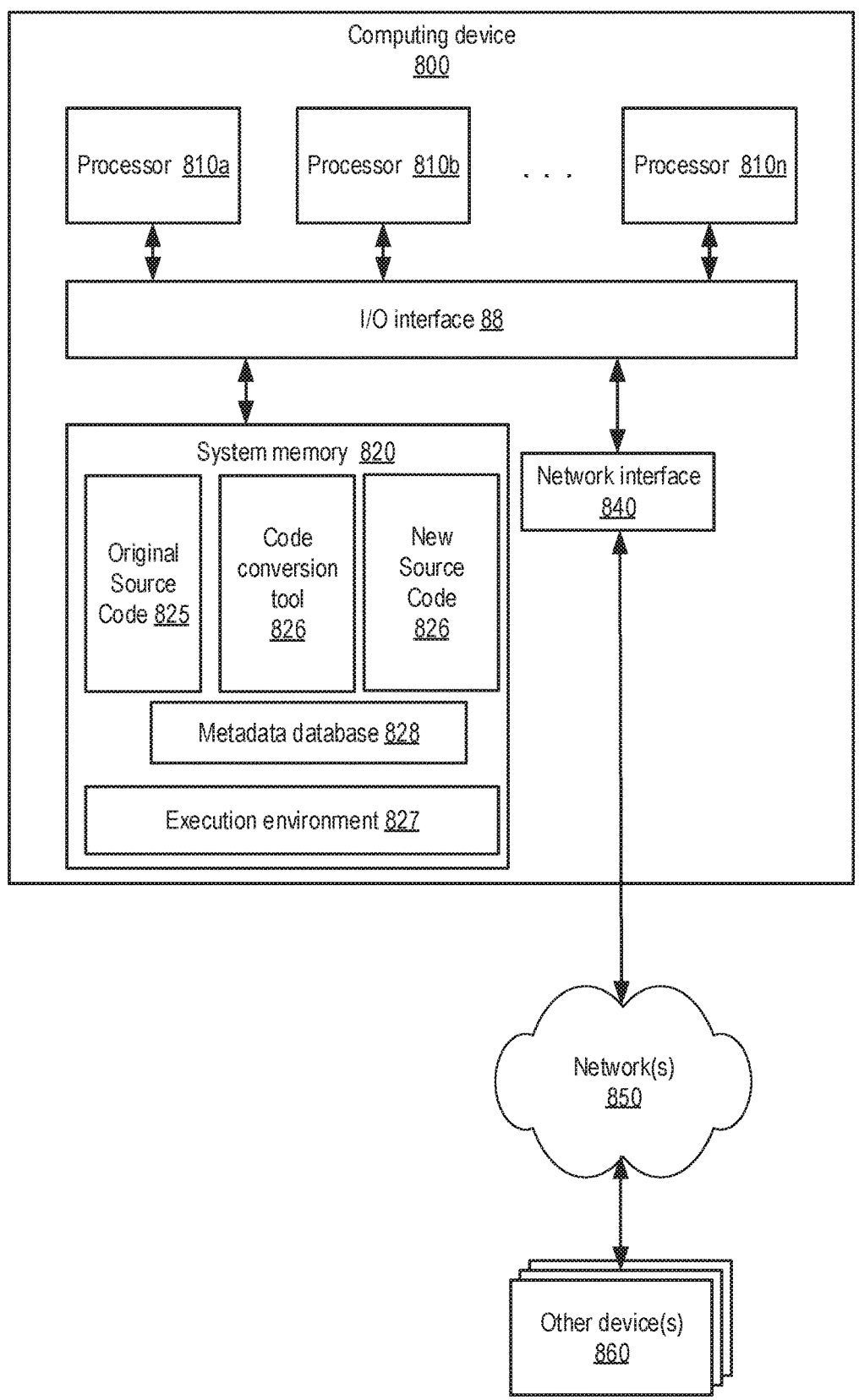
FIG. 8 is a block diagram illustrating a computing device configured to analyze and translate source code according to at least some embodiments.

FIG. 8 is a block diagram illustrating a computing device 800 configured to implement a code conversion tool with support for identifying restructuring/refactoring options of the kind described above, according to at least some embodiments. In some embodiments, the computing device includes one or more processors (810*a*-180*n*) configured to execute program code that implements the methods and mechanisms described herein. In other embodiments, the computing device includes custom circuitry configured to implement the methods and mechanisms described herein. In yet other embodiments, the computing device may include some custom circuitry configured to perform at least a portion of the methods and mechanisms described herein while other portions are performed by a general purpose processor executing program code. The computing device 800 may correspond to any of various kinds of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any kind of computing device. In the illustrated embodiment, computing device 800 includes one or more cores or processors 810 coupled to a storage device such as system memory 820 via an input/output (I/O) interface 830. Computing device 800 further includes a network interface 840 coupled to I/O interface 830.

In various embodiments, computing device 800 may be a uniprocessor system including one processor 810, or a multiprocessor system including several cores or processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the SPARC, x86, PowerPC, or MIPS ISAs, or any other suitable ISA. In multiprocessor systems, each of processors 810 may commonly, but not necessarily, implement the same ISA.

System memory 820 may be configured to store program instructions implementing a code conversion tool 826, original source code 825, and new source code 826 generated by the code conversion tool 826, a metadata database 828, and an execution environment 827 (e.g., a JAVA virtual machine). System memory may also include program instructions and/or data for various other applications. Program instructions may be encoded in platform native binary, any interpreted language such as JAVA bytecode, or in any other language such as C/C++, JAVA, etc. or in any combination thereof. In various embodiments, system memory 820 may be implemented using any suitable memory technology, such as static random access memory (SRAM), synchronous dynamic RAM (SDRAM), nonvolatile/Flash-type memory, or any other kind of memory.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other devices 860 attached to a network or networks 850, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above for FIG. 1 through 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic, or digital signals, conveyed via a communication medium such as a network and/or a wireless link, which may be implemented via network interface 840. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A non-transitory, computer-readable storage medium storing program instructions that when executed on a computing device cause the computing device to:
    receive, by a code conversion tool, a command to translate source code from a first high level language to source code in a second high level language different from the first high level language;
    access, by the code conversion tool, the source code in the first high level language;
    analyze, by the code conversion tool, the source code in the first high level language;
    generate a data structure representative of the source code in the first high level language, wherein the data structure includes at least an identification of each symbol used within the source code in the first high level language;
    analyze the data structure to identify symbols corresponding to a semantic entity;
    for each symbol identified as corresponding to a semantic entity:
        generate a globally unique identifier for the symbol comprising at least a fully qualified name within a given namespace;
        associate the globally unique identifier with the symbol;
        determine whether the symbol corresponds to an existing definition for the symbol, wherein the definition is a semantic entity definition in the source code in the first high level language;
        store data that associates the symbol with the existing definition, in response to determining the symbol corresponds to an existing definition for the symbol;
    generate the source code in the second high level language;
    generate metadata, wherein the metadata maps symbols corresponding to a semantic entity in the source code of the second high level language to symbols corresponding to a semantic entity definition in the source code of the first high level language; and
    output the second source code and the metadata such that the metadata is associated with the second source code.

2. The non-transitory computer-readable storage medium as recited in claim 1, wherein the globally unique identifier is unique within an entire codebase of the source code of the first high level language and is further associated with only a single corresponding entity in the second high level language.

3. The non-transitory computer-readable storage medium as recited in claim 2, wherein the metadata associates the globally unique identifier with a fully qualified name in the codebase and a location of a corresponding entity in the codebase.

4. The non-transitory computer-readable storage medium as recited in claim 2, wherein for each symbol corresponding to a semantic entity in the source code of the second high level language, the metadata includes at least an identification of a location of the symbol corresponding to a semantic entity in the source code of the first high level language, a globally unique identifier associated with the symbol corresponding to a semantic entity in the source code of the first high level language, and a location of a corresponding symbol corresponding to a semantic entity definition in the source code of the first high level language.

5. The non-transitory computer-readable storage medium as recited in claim 1, where the program instructions further cause the computing device to generate an annotation in the source code of the second high level language, wherein the annotation includes at least an indication of a kind of conversion performed when generating the source code of the second high level language, said kind being at least one of an automatic conversion and a manual conversion.

6. The non-transitory computer-readable storage medium as recited in claim 5, where the annotation further includes one or more of:
    an indication that the conversion was performed based at least in part on a feature present in the source code of the first high level language that is not present in the source code of the second high level language; and
    an indication that the conversion was performed based at least in part on a performance related feature.

7. The non-transitory computer-readable storage medium as recited in claim 6, where the performance related feature is one or more of:
    a load time optimization;
    an execution time optimization; and
    a memory usage optimization.

8. The non-transitory computer-readable storage medium as recited in claim 1, wherein the program instructions further cause the computing device to generate an annotation in the source code of the second high level language, where the annotation includes one or more of an indication that the converted code:
    was modified to correct a compilation error;
    represents intentional duplication to increase performance; and
    was modified to correct a semantic error in the second high level language.

9. A computer implemented method for converting source code from a first high level language to a second high level language, wherein said method comprises:
    a computing device comprising circuitry:
        receiving a command to translate the source code from the first high level language to source code in the second high level language different from the first high level language;
        accessing the source code in the first high level language;

analyzing the source code in the first high level language;
generating a data structure representative of the source code in the first high level language, wherein the data structure includes at least an identification of each symbol used within the source code in the first high level language;
analyzing the data structure to identify symbols corresponding to a semantic entity;
for each symbol identified as corresponding to a semantic entity:
  generating a globally unique identifier for the symbol comprising at least a fully qualified name within a given namespace;
  associating the globally unique identifier with the symbol;
  determining whether the symbol corresponds to an existing definition for the symbol, wherein the definition is a semantic entity definition in the source code in the first high level language;
  storing data that associates the symbol with the existing definition, in response to determining the symbol corresponds to an existing definition for the symbol;
generating the source code in the second high level language;
generating metadata, wherein the metadata maps symbols corresponding to a semantic entity in the source code of the second high level language to symbols corresponding to a semantic entity definition in the source code of the first high level language; and
outputting the second source code and the metadata such that the metadata is associated with the second source code;
a storage device storing the second source code and metadata.

10. The computer implemented method as recited in claim 9, wherein the globally unique identifier is unique within an entire codebase of the source code of the first high level language and is further associated with only a single corresponding entity in the second high level language.

11. The computer implemented method as recited in claim 10, wherein the metadata associates the globally unique identifier with a fully qualified name in the codebase and a location of a corresponding entity in the codebase.

12. The computer implemented method as recited in claim 9, wherein for each symbol corresponding to a semantic entity in the source code of the second high level language, the metadata includes at least an identification of a location of the symbol corresponding to a semantic entity in the source code of the first high level language, a globally unique identifier associated with the symbol corresponding to a semantic entity in the source code of the first high level language, and a location of a corresponding symbol corresponding to a semantic entity definition in the source code of the first high level language.

13. The computer implemented method as recited in claim 9, where the program instructions further cause the computing device to generate an annotation in the source code of the second high level language, wherein the annotation includes at least an indication of a kind of conversion performed when generating the source code of the second high level language, said kind being at least one of an automatic conversion and a manual conversion.

14. The computer implemented method as recited in claim 13, where the annotation further includes one or more of:
an indication that the conversion was performed based at least in part on a feature present in the source code of the first high level language that is not present in the source code of the second high level language; and
an indication that the conversion was performed based at least in part on a performance related feature.

15. The computer implemented method as recited in claim 14, where the performance related feature is one or more of:
a load time optimization;
an execution time optimization; and
a memory usage optimization.

16. A computing device configured to:
receive a command to translate source code from a first high level language to source code in a second high level language different from the first high level language;
access a first storage device storing the source code in the first high level language;
analyze the source code in the first high level language;
generate a data structure representative of the source code in the first high level language, wherein the data structure includes at least an identification of each symbol used within the source code in the first high level language;
analyze the data structure to identify symbols corresponding to a semantic entity;
for each symbol identified as corresponding to a semantic entity:
  generate a globally unique identifier for the symbol comprising at least a fully qualified name within a given namespace;
  associate the globally unique identifier with the symbol;
  determine whether the symbol corresponds to an existing definition for the symbol, wherein the definition is a semantic entity definition in the source code in the first high level language;
  store data that associates the symbol with the existing definition, in response to determining the symbol corresponds to an existing definition for the symbol;
generate the source code in the second high level language;
generate metadata, wherein the metadata maps symbols corresponding to a semantic entity in the source code of the second high level language to symbols corresponding to a semantic entity definition in the source code of the first high level language; and
output the second source code and the metadata to a second storage device such that the metadata is associated with the second source code.

17. The computing device as recited in claim 16, wherein the globally unique identifier is unique within an entire codebase of the source code of the first high level language and is further associated with only a single corresponding entity in the second high level language.

18. The computing device as recited in claim 17, wherein the globally unique identifier comprises a fully qualified name within the codebase and one or more additional characters that serve to distinguish any other entities in the codebase that also have said fully qualified name.

19. The computing device as recited in claim 18, wherein the metadata associates the globally unique identifier with a fully qualified name in the codebase and a location of a corresponding entity in the codebase.

20. The computing device as recited in claim 16, wherein for each symbol corresponding to a semantic entity in the source code of the second high level language, the metadata includes at least an identification of a location of the symbol corresponding to a semantic entity in the source code of the first high level language, a globally unique identifier associated with the symbol corresponding to a semantic entity in the source code of the first high level language, and a location of a corresponding symbol corresponding to a semantic entity definition in the source code of the first high level language.

* * * * *